(No Model.)

P. M. WOMBLE.
Dumping Car.

No. 238,827. Patented March 15, 1881.

Witnesses,
W. A. Bertram

Inventor,
P. M. Womble.

by
R. W. Williams.
Attorney.

UNITED STATES PATENT OFFICE.

PEMBROKE M. WOMBLE, OF BALTIMORE, MARYLAND.

DUMPING-CAR.

SPECIFICATION forming part of Letters Patent No. 238,827, dated March 15, 1881.

Application filed January 24, 1881. (No model.)

*To all whom it may concern:*

Be it known that I, PEMBROKE M. WOMBLE, of Baltimore city, State of Maryland, have invented certain new and useful Improvements in Dumping-Cars; and I hereby declare the same to be fully, clearly, and exactly described as follows, reference being had to the accompanying drawings, in which—

Figure 1:
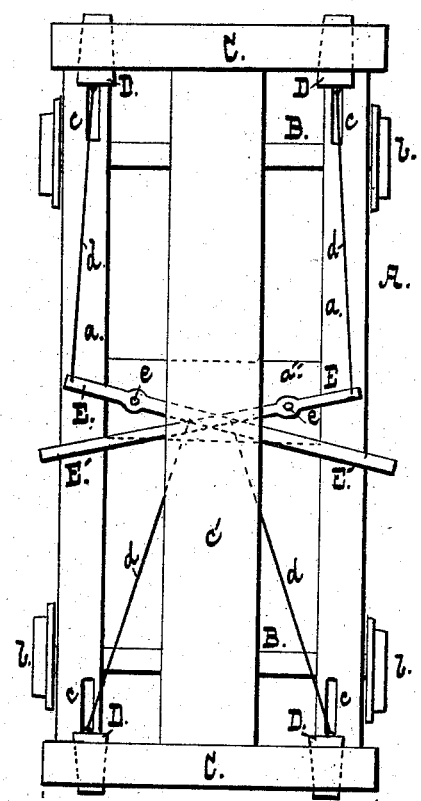
Figure 2:
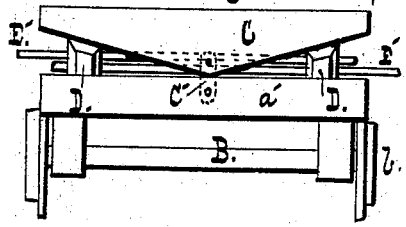

Figure 1 is a plan of the device. Fig. 2 is an end elevation of the same.

My invention relates to dumping cars or vehicles generally, and in particular to the carriers used for transporting sawed lumber from the feed-carrier of saw-mills to the pile and dumping it thereon.

Heretofore the lumber has simply been piled on a car or carriage which was run on rails to the chutes, and the planks, joists, or scantlings were then thrown off by hand, involving a considerable expenditure of time and labor. I have devised a carrier which saves the greater part of this labor, and is simple in construction and readily adaptable to the saw-mill feed-carriers now in use.

The invention will first be described, and then pointed out in the claim.

In the drawings, A is the car, having wheels $b$ mounted on axles B of a gage to fit the railway leading to the chute or dump and alongside the feed-carrier.

C C are the bars for supporting the load, connected by a plank, $c'$, and which are V-shaped on their under sides and rest upon the transverse end pieces, $a'$, of the car, being connected thereto by links $C'$, pivoted to each.

The side bars, $a$, are slotted at the ends, as at $c$, and in the slots slide wedge-blocks D, which come between the parts C and $a'$ and normally hold the bars C horizontal.

Levers E, having handles $E'$, that project at either side of the car, are pivoted at $e$ to the transverse piece $a''$, and are connected with the wedge-blocks D by rods $d$, pivoted at either side of their fulcra, as shown, so that upon throwing the handle of either lever to one side the wedge-blocks on the other side of the car are either simultaneously withdrawn or thrust under the bars C, according to the direction of the motion of the handle. Instead of a wedge at either end, a single wedge might be used; but two are preferred, as lessening strain.

In operation, the car being run alongside of the feed-carrier, the planks are laid on the car as fast as sawed until the car is laden. It is then run out to the chute and the handle on the side opposite to the chute is thrown back, drawing the wedges on the other side from under the bars C. A slight push suffices then to cant the bars, and the load is thrown off into the chute. The lever being returned to the first position, the car is then run back to receive the next load.

The device is very simple and readily applied to the ordinary cars, and is thoroughly efficient and satisfactory in operation.

While I have described the device as applied to a single use—namely, as a lumber-dump for saw-mills—it is obvious that the same is equally applicable to other uses to which a dumping car or vehicle is ordinarily put, such as for dumping coal or bricks or for use in ballasting railroads.

What I claim is—

In a dumping-car, a platform mounted on bars having V-shaped lower faces, which rest on transverse beams $a'$, in combination with longitudinally-sliding wedges, and levers E, for simultaneously retracting the wedges on the same side of the car, as set forth.

PEMBROKE M. WOMBLE.

Witnesses:
R. D. WILLIAMS,
J. C. GITTINGER.